US012795531B2

(12) United States Patent
Kim et al.

(10) Patent No.: US 12,795,531 B2
(45) Date of Patent: Nov. 10, 2026

(54) METHOD AND APPARATUS FOR SUPPORTING ROAMING SERVICE TRAFFIC ROUTING IN MOBILE COMMUNICATION SYSTEM

(71) Applicant: Samsung Electronics Co., Ltd., Suwon-si (KR)

(72) Inventors: Hyesung Kim, Suwon-si (KR); Jicheol Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 174 days.

(21) Appl. No.: 18/807,244

(22) Filed: Aug. 16, 2024

(65) Prior Publication Data

US 2025/0063485 A1 Feb. 20, 2025

(30) Foreign Application Priority Data

Aug. 16, 2023 (KR) ........................ 10-2023-0106870

(51) Int. Cl.
*H04W 48/18* (2009.01)
*H04W 48/16* (2009.01)
*H04W 84/04* (2009.01)

(52) U.S. Cl.
CPC ........... *H04W 48/18* (2013.01); *H04W 48/16* (2013.01); *H04W 84/042* (2013.01)

(58) Field of Classification Search
CPC .. H04B 1/7075; H04L 12/5691; H04W 16/26; H04W 48/16; H04W 48/18; H04W 84/04; H04W 84/042; H04W 84/045–045
See application file for complete search history.

(56) References Cited

U.S. PATENT DOCUMENTS

2024/0080651 A1* 3/2024 Keller ...................... H04W 8/06
2024/0224147 A1* 7/2024 Lee ..................... H04W 36/142
(Continued)

FOREIGN PATENT DOCUMENTS

EP 3 913 986 A1 11/2021
EP 4 366 345 A1 5/2024
WO 2023/003326 A1 1/2023
(Continued)

OTHER PUBLICATIONS

3rd Generation Partnership Project; Technical Specification Group Services and System Aspects; 5G System Enhancements for Edge Computing; Stage 2 (Release 18), 3GPP TS 23.548 V18.2.0, Jun. 22, 2023.

(Continued)

*Primary Examiner* — Thomas R Cairns
(74) *Attorney, Agent, or Firm* — Jefferson IP Law, LLP

(57) ABSTRACT

The disclosure relates to a 5G or 6G communication system for supporting a higher data transmission rate. A method performed by an access and mobility management function (AMF) in a communication system includes receiving, from a user equipment (UE), a registration request message, receiving, from a unified data management (UDM), subscription information for session management function (SMF) selection including an identifier (ID) of a target public land mobile network (PLMN) for traffic routing, and selecting an SMF for traffic routing in the target PLMN based on the ID of the target PLMN included in the subscription information.

16 Claims, 8 Drawing Sheets

(56) References Cited

U.S. PATENT DOCUMENTS

| | | | | |
|---|---|---|---|---|
| 2024/0389002 A1* | 11/2024 | Shekhar | ................ | H04W 48/16 |
| 2025/0031166 A1* | 1/2025 | Gupta | ................... | H04W 60/00 |

FOREIGN PATENT DOCUMENTS

| | | | | | |
|---|---|---|---|---|---|
| WO | WO-2024185726 A1 * | 9/2024 | | ............ | H04W 60/04 |
| WO | WO-2024185727 A1 * | 9/2024 | | .......... | H04W 36/249 |
| WO | WO-2024238250 A1 * | 11/2024 | | .............. | H04W 8/12 |
| WO | WO-2025016968 A1 * | 1/2025 | | .............. | H04W 8/18 |

OTHER PUBLICATIONS

Catt, Support of edge relocation for accessing EHE when roaming, S2-2302752, SA WG2 Meeting #155, Athens, Greece, Feb. 10, 2023.

International Search Report dated Nov. 19, 2024, issued in International Application No. PCT/KR2024/012212.

3GPP TS 23.501 V18.2.2, 3rd Generation Partnership Project; Technical Specification Group Services and System Aspects; System architecture for the 5G System (5GS); Stage 2 (Release 18), Jul. 7, 2023.

3GPP TS 23.502 V18.2.0, 3rd Generation Partnership Project; Technical Specification Group Services and System Aspects; Procedures for the 5G System (5GS); Stage 2 (Release 18), Jun. 29, 2023.

Gundavelli Sri et al., Subscription-Based Routing To a Particular Core Network, Technical Disclosure Commons, pp. 1-5, Apr. 25, 2023.

European Search Report dated Sep. 22, 2026, issued in European Application No. 24854484.3.

* cited by examiner

METHOD AND APPARATUS FOR SUPPORTING ROAMING SERVICE TRAFFIC ROUTING IN MOBILE COMMUNICATION SYSTEM

CROSS-REFERENCE TO RELATED APPLICATION(S)

This application is based on and claims priority under 35 U.S.C. § 119(a) of a Korean patent application number 10-2023-0106870, filed on Aug. 16, 2023, in the Korean Intellectual Property Office, the disclosure of which is incorporated by reference herein in its entirety.

BACKGROUND

1. Field

The disclosure relates to a mobile communication system. More particularly, the disclosure relates to a method and an apparatus for supporting roaming service traffic routing in a mobile communication system.

2. Description of Related Art 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with extended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, metamaterial-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

The above information is presented as background information only to assist with an understanding of the disclosure. No determination has been made, and no assertion is made, as to whether any of the above might be applicable as prior art with regard to the disclosure.

SUMMARY

When a home network operator operates multiple public land mobile networks (PLMNs) (for example, when multiple PLMN identifiers (IDs) are used), there is a need to support a method for selecting a PLMN to process roaming traffic of a specific subscriber and for designating a home network function.

In addition, there is a need to support a method for routing traffic of a roaming UE to a core network of another country operated by a home network operator, or to a partner core network of the home network operator.

Aspects of the disclosure are to address at least the above-mentioned problems and/or disadvantages and to provide at least the advantages described below. Accordingly, an aspect of the disclosure is to provide a method for transmitting service traffic of a roaming UE to a specific home network.

Additional aspects will be set forth in part in the description which follows and, in part, will be apparent from the description, or may be learned by practice of the presented embodiments.

In accordance with an aspect of the disclosure, a method performed by an access and mobility management function (AMF) in a communication system is provided. The method includes receiving, from a user equipment (UE), a registration request message, receiving, from a unified data management (UDM), subscription information for session management function (SMF) selection including an identifier (ID) of a target public land mobile network (PLMN) for traffic routing, and selecting an SMF for traffic routing in the target PLMN based on the ID of the target PLMN included in the subscription information.

In accordance with another aspect of the disclosure, a method performed by a visited-network repository function (v-NRF) in a communication system is provided. The method includes receiving, from an AMF, a first network function (NF) discovery request message for SMF selection including an ID of a target PLMN for traffic routing, transmitting, to a home-network repository function (h-NRF), a second NF discovery request message including the ID of the target PLMN, receiving, from h-NRF, a first NF discovery request response message including information on an SMF for traffic routing in the target PLMN, and transmitting, to the AMF, a second NF discovery request response message including information on the SMF for traffic routing in the target PLMN.

In accordance with another aspect of the disclosure, a method performed by an h-NRF in a communication system is provided. The method includes receiving, from a v-NRF, a first NF discovery request message including an ID of a target PLMN for traffic routing, identifying an SMF for traffic routing in the target PLMN based on the ID of the target PLMN, and transmitting, to the v-NRF, a first NF discovery request response message including information on the SMF for traffic routing in the target PLMN.

In accordance with another aspect of the disclosure, an AMF in a communication system is provided. The AMF includes a transceiver and a controller coupled with the transceiver and configured to receive, from a UE, a registration request message, receive, from a UDM, subscription information for SMF selection including an ID of a target PLMN for traffic routing, and select an SMF for traffic routing in the target PLMN based on the ID of the target PLMN included in the subscription information.

In accordance with another aspect of the disclosure, a v-NRF in a communication system is provided. The v-NRF includes a transceiver and a controller coupled with the transceiver and configured to receive, from an AMF, a first NF discovery request message for SMF selection including an ID of a target PLMN for traffic routing, transmit, to an h-NRF, a second NF discovery request message including the ID of the target PLMN, receive, from h-NRF, a first NF discovery request response message including information on an SMF for traffic routing in the target PLMN, and transmit, to the AMF, a second NF discovery request response message including information on the SMF for traffic routing in the target PLMN.

In accordance with another aspect of the disclosure, an h-NRF in a communication system is provided. The h-NRF includes a transceiver and a controller coupled with the transceiver and configured to receive, from a v-NRF, a first NF discovery request message including an ID of a target PLMN for traffic routing, identify an SMF for traffic routing in the target PLMN based on the ID of the target PLMN, and transmit, to the v-NRF, a first NF discovery request response message including information on the SMF for traffic routing in the target PLMN.

In accordance with another aspect of the disclosure, one or more non-transitory computer-readable storage media storing one or more computer programs including computer-executable instructions that, when executed by one or more processors of an access and mobility management function (AMF) in a communication system individually or collectively, cause the AMF in a communication system to perform operations is provided. The operations include receiving, from a user equipment (UE), a registration request message, receiving, from a unified data management (UDM), subscription information for session management function (SMF) selection including an identifier (ID) of a target public land mobile network (PLMN) for traffic routing, and selecting an SMF for traffic routing in the target PLMN based on the ID of the target PLMN included in the subscription information.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1A:
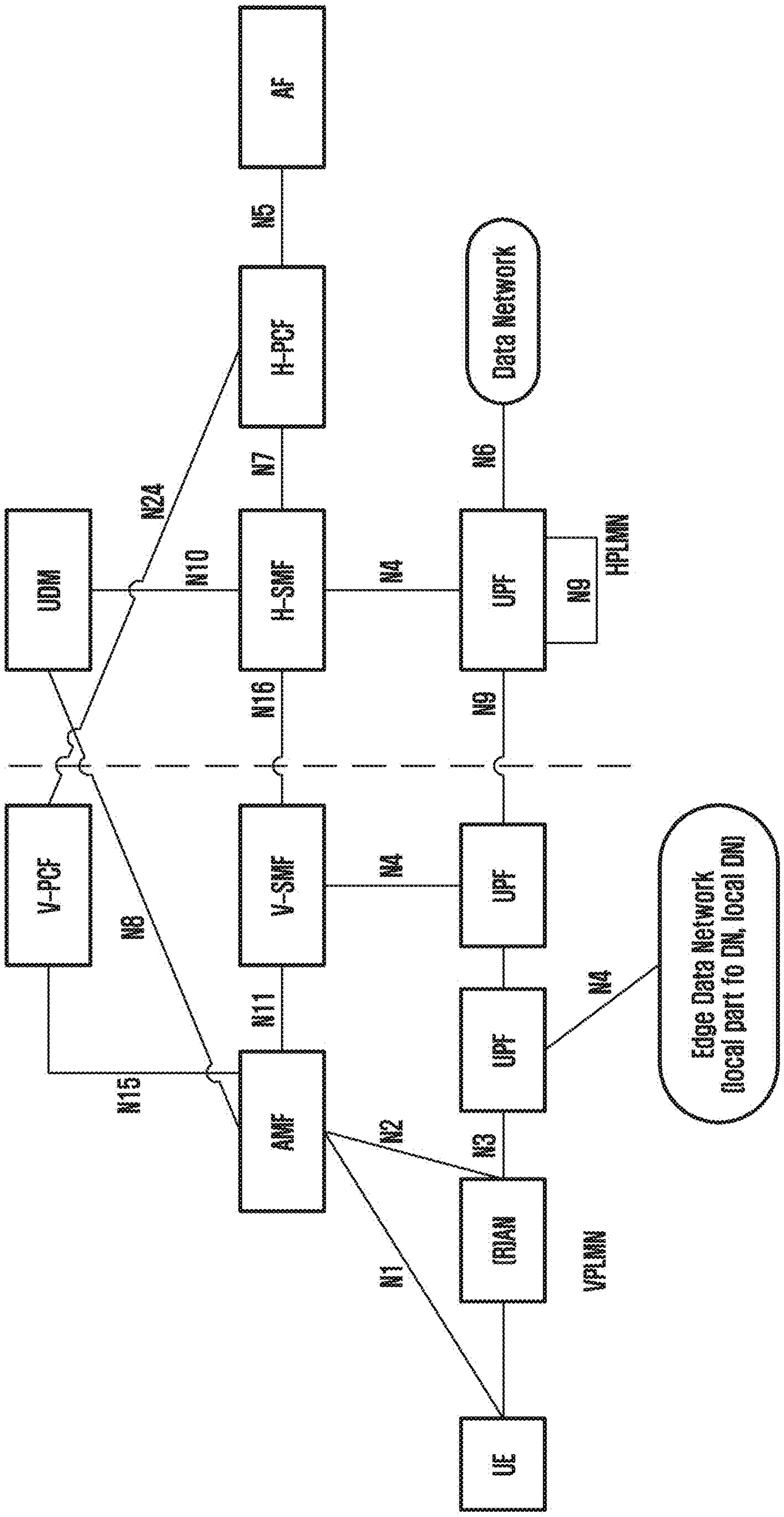
FIG. 1A illustrates a structure of a 5G system supporting a home-routed (HR) roaming service according to an embodiment of the disclosure.

The following description with reference to the accompanying drawings is proved to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, description of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular form "a," "an,", and "the" include plural referents unless the context clearly dictates otherwise. Thus, for example, reference to "a component surface" includes reference to one or more of such surfaces.

In describing the embodiments in the specification, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Furthermore, the size of each element does not completely reflect the actual size. In the respective drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference signs indicate the same or like elements.

It will be understood that each block of the flowchart illustrations, and combinations of blocks in the flowchart illustrations, can be implemented by computer program instructions. These computer program instructions can be provided to a processor of a general-purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide operations for implementing the functions specified in the flowchart block or blocks.

Each block in the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used in embodiments of the disclosure, the "unit" refers to a software element or a hardware element, such as a field programmable gate array (FPGA) or an application specific integrated circuit (ASIC), which performs a predetermined function. However, the "unit" does not always have a meaning limited to software or hardware. The "unit" may be constructed either to be stored in an addressable storage medium or to execute one or more processors. The "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" may be implemented to reproduce one or more CPUs within a device or a security multimedia card.

The disclosure provides an apparatus and a method for providing interworking of a network slice (or network slicing) in a wireless communication system. Specifically, a 5G network system structure for providing a network slice function in a wireless communication system and a technology for interworking between EPS network systems will be described through the disclosure.

In the following description, terms referring to signals, terms referring to channels, terms referring to control information, terms referring to network entities, terms referring to device elements, and the like are illustratively used for the sake of descriptive convenience. Therefore, the disclosure is not limited by the terms as described below, and other terms having equivalent technical meanings may be used.

Various embodiments of the disclosure will be described using terms used in some communication standards (e.g., the 3rd generation partnership project (3GPP)), but they are for illustrative purposes only. Various embodiments of the disclosure may be easily applied to other communication systems through modifications.

Hereinafter, the operation principle of the disclosure will be described in detail in conjunction with the accompanying drawings. The terms which will be described below are terms defined in consideration of the functions in the disclosure. They may be different according to users, intentions of the users, or customs, and therefore, the definitions of the terms should be made based on the contents throughout the specification.

Terms referring to network entities or network functions and entities of edge computing systems, terms referring to messages, terms referring to identification information, and the like are illustratively used for the sake of descriptive convenience. Therefore, the disclosure is not limited by the terms as described below, and other terms referring to subjects having equivalent technical meanings may also be used.

In the following description, the disclosure will be described using terms and names defined in the 5G system standards for the sake of descriptive convenience, but the disclosure is not limited by these terms and names and may be applied in the same way to systems that conform other standards.

It should be appreciated that the blocks in each flowchart and combinations of the flowcharts may be performed by one or more computer programs which include computer-executable instructions. The entirely of the one or more computer programs may be stored in a single memory device or the one or more computer programs may be divided with different portions stored in different multiple memory devices.

Any of the functions or operations described herein can be processed by one processor or a combination of processors. The one processor or the combination of processors is circuitry performing processing and includes circuitry like an application processor (AP, e.g., a central processing unit (CPU)), a communication processor (CP, e.g., a modem), a graphical processing unit (GPU), a neural processing unit (NPU) (e.g., an artificial intelligence (AI) chip), a wireless-fidelity (Wi-Fi) chip, a Bluetooth™ chip, a global positioning system (GPS) chip, a near field communication (NFC) chip, connectivity chips, a sensor controller, a touch controller, a finger-print sensor controller, a display drive integrated circuit (IC), an audio CODEC chip, a universal serial bus (USB) controller, a camera controller, an image processing IC, a microprocessor unit (MPU), a system on chip (SoC), an IC, or the like.

Figure 1B:
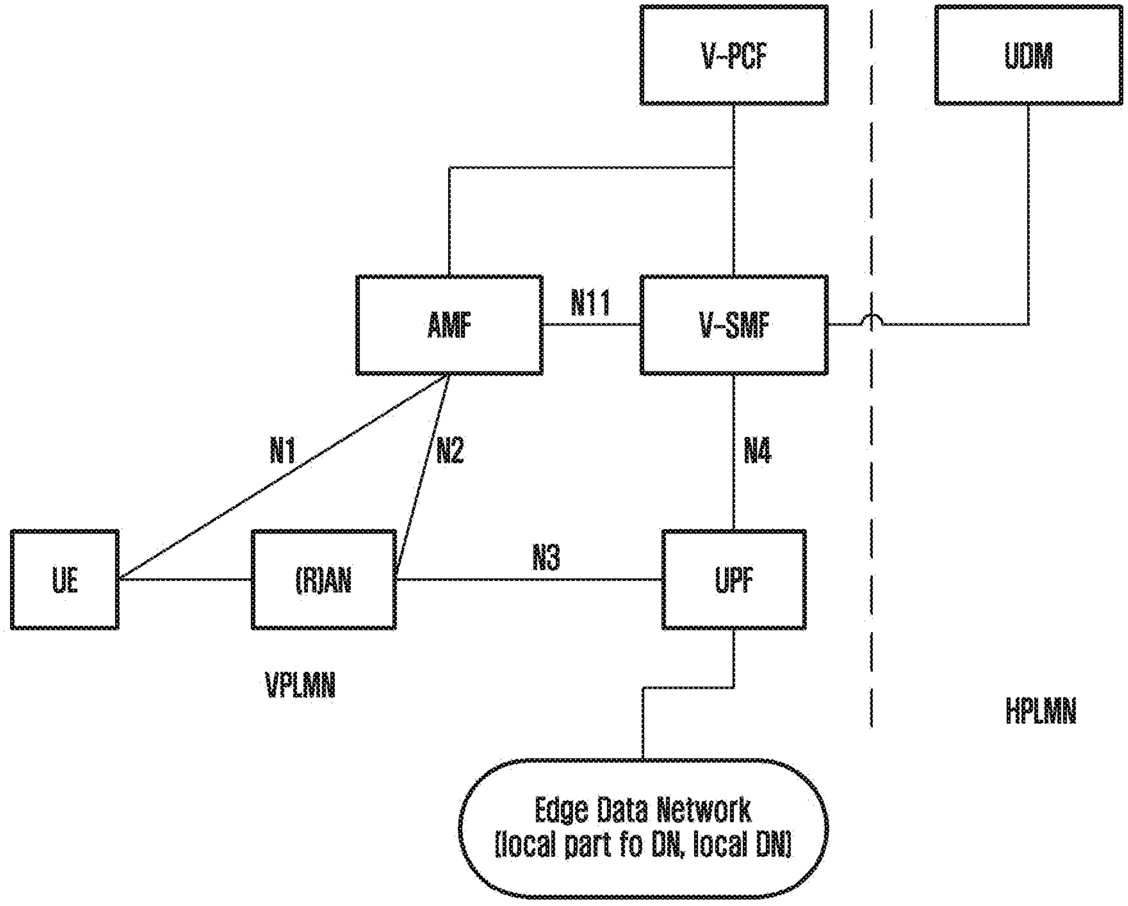
FIG. 1B illustrates a structure of a 5G system supporting a local breakout (LBO) roaming service according to an embodiment of the disclosure.

FIGS. 1A and 1B illustrate a structure of a 5G system supporting an HR roaming service and the structure of a 5G system supporting an LBO roaming service according to various embodiments of the disclosure.

A 5G system structure that supports roaming may include various network functions (NFs), and FIGS. 1A and 1B illustrate, for example, an access and mobility management function (AMF), a session management function (SMF), a policy control function (PCF), unified data management (UDM), a data network (DN) or an edge data network (local part of DN (or local DN) in which local access to the data network is possible), a user plane function (UPF), an application function (AF), a (radio) access network ((R)AN), and user equipment (UE).

Roaming in a 5G system may guarantee that a user can move out of the service region of a home network (or home-public land mobile network (H-PLMN)) and then connect to a visited network (or visited-public land mobile network (V-PLMN)), thereby continuously accessing a mobile service. In an embodiment, FIG. 1A illustrates a home-routed (HR) roaming scenario. In the case of HR roaming, even if a UE is positioned in a visited network, the user's data path may be configured from the visited network to a home network, and may be routed to a data network through the home network. In the case of HR roaming, the home network may control the user's traffic and data, and accounting and policy control may also be simplified. Meanwhile, FIG. 1B illustrates a local breakout (LBO) roaming scenario. In the case of LBO roaming, the user's data may be directly routed from the visited network to the data network without having to retransmit the same through the home network.

Respective NFs may support functions as follows:

- The AMF provides a function for access and mobility management at the UE level, and one UE may be basically connected to one AMF.
- The DN may refer to an operator service, an Internet access or 3rd party service, or the like, for example. The DN may transmit a downlink protocol data unit (PDU) or may receive a PDU transmitted from the UE from the UPF. The local part of DN may refer to a data network which is a part of the DN such that local access is possible, and which has a short data transmission path. Alternatively, the local part of DN may refer to a DN in which an edge application server that supports an edge computing service is disposed.
- The PCF may provide functions of receiving information regarding a packet flow from an application server and determining policies such as mobility management and session management. Specifically, the PCF may support functions of supporting a single policy framework for controlling network operations, providing policy rules such that control plane function(s) (for example, AMF, SMF, and the like) can practice the policy rules, implementing a front end for accessing subscription information related to policy decision in a unified data repository (UDR), and the like. A PCF belonging to the H-PLMN may be referred to as a home-PCF (H-PCF), and a PCF belonging to the V-PLMN may be referred to as a visited-PCF (V-PCF).
- The SMF provides a session management function. If the UE has multiple sessions, respective sessions may be managed by different SMFs. An SMF belonging to the H-PLMN may be referred to as a home-SMF (H-SMF), and an SMF belonging to the V-PLMN may be referred to as a visited-SMF (V-SMF).
- The UDM may store the user's subscription data, policy data, and the like.
- The UPF may transfer a downlink PDU received from the DN to the UE via the (R)AN, and may transfer an uplink PDU received from the UE via the (R)AN to the DN. An uplink classifier (ULCL) may refer to a UPF having a function of classifying and transmitting uplinks. A local UPF (L-UPF) may play the role of an anchor of a session transmitted to the local part of DN (PDU session anchor).

The AF may provide service-related information or application-related information to an NF service customer. Through the AF, the NF service customer may subscribe to regular notifications and/or notifications related to subscribed event sensing or unsubscribe therefrom.

Figure 2:
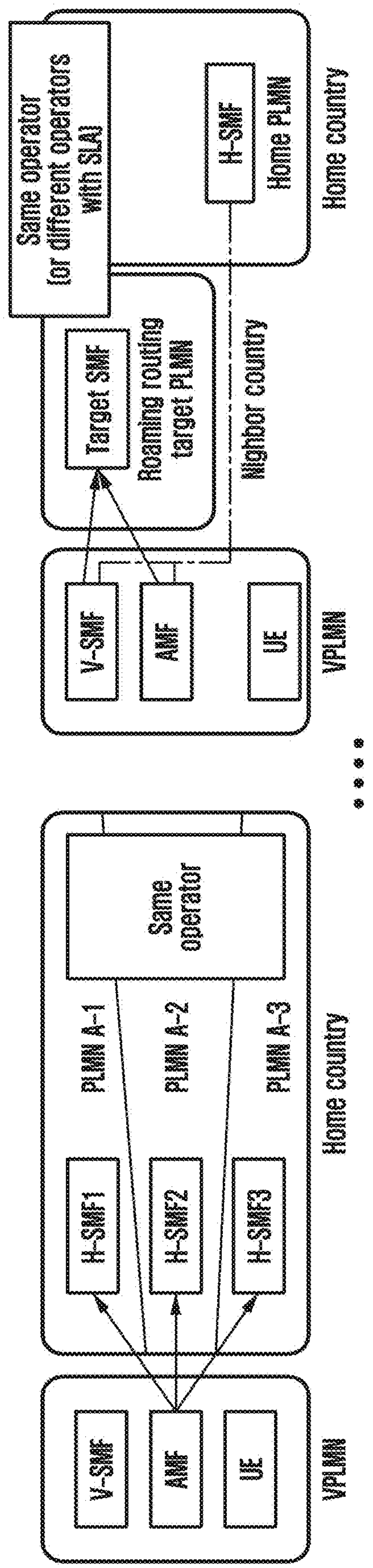
FIG. 2 illustrates routing a roaming UE's service traffic of a roaming UE to a hosting environment of a home network according to an embodiment of the disclosure.

FIG. 2 illustrates routing a roaming UE's service traffic of a roaming UE to a hosting environment of a home network according to an embodiment of the disclosure.

FIG. 2 illustrates examples of a scenario in which a home network is selected to provide a roaming service to a roaming UE, and the NF of the selected home network is selected.

The left side of FIG. 2 illustrates a scenario in which the home network operator of a currently roaming UE operates multiple PLMNs in one country (within the border of the home country of the subscriber). In an embodiment, home network operator A may operate multiple PLMNs identified by PLMN A-1 to A-3. For example, the PLMNs may be regionally divided and operated. In such a case, home network operator A may entrust management of a home routing PDU session of a roaming UE registered in the VPLMN to a PLMN selected from PLMN A-1 to A-3. Specifically, connection to the V-SMF may be made by selecting an H-SMF disposed in a PLMN ID (for example, PLMN A-2) other than the PLMN ID (for example, PLMN A-1) specified in the UE's identifier (for example, subscription permanent identifier (SUPI)). In such an example, in the disclosure, the PLMN identified by the PLMN ID included in the UE's identifier may be referred to an existing home network, and the roaming routing target network other than the PLMN which may be identified by the UE's identifier may be referred to as a roaming routing target PLMN or an alternative home routing PLMN. On the left side of FIG. 2, PLMN A-1 may correspond to the existing home network, and PLMN A-2 or PLMN A-3 may correspond to the roaming routing target PLMN or alternative home routing PLMN.

In another embodiment, the right side of FIG. 2 illustrates a scenario in which a home routing session is created by a PLMN of a partner operator of an existing home network operation of a roaming UE. In an example, a home routing session may be connected to a PLMN disposed to a country adjacent to the country in which the UE is currently roaming, other than the PLMN which may be identified by information included in the UE's identifier (that is, the PLMN which provided a communication service in the home country of the roaming UE (home PLMN)). In such a scenario, the operator who operates the PLMN (disposed in the adjacent country) selected as the roaming routing target PLMN may be identical to the home network operator, or may be a partner operator having a service level agreement.

Figure 3:
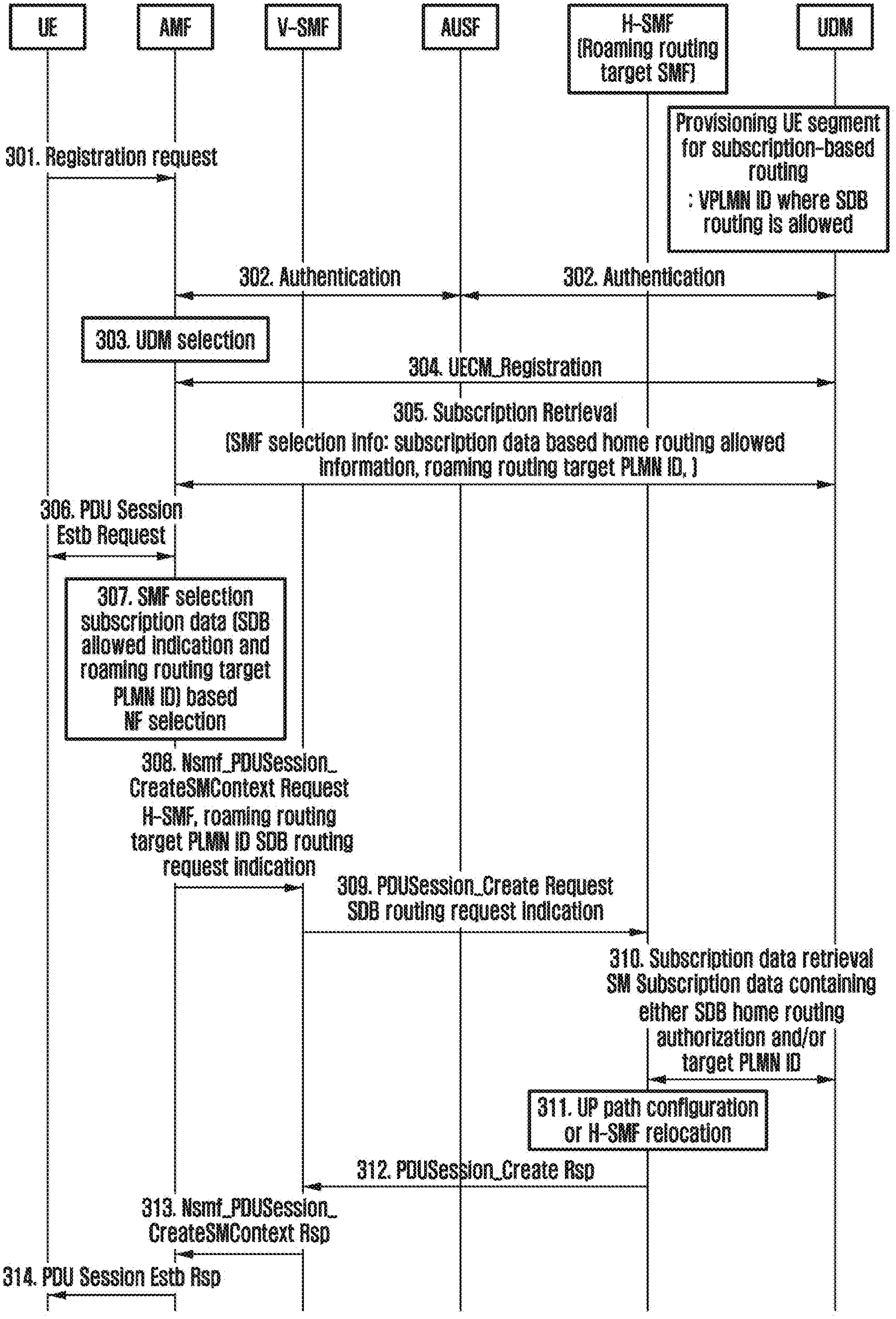
FIG. 3 is a sequence diagram illustrating a method for selecting a roaming UE's roaming routing target network or an alternative home routing PLMN according to an embodiment of the disclosure.

FIG. 3 is a sequence diagram illustrating a method for selecting a roaming UE's roaming routing target network or an alternative home routing PLMN according to an embodiment of the disclosure.

Referring to FIG. 3, the UDM may store and manage subscription data-based home routing (SDB HR) allowed information. The UDM may have such information configured therefor by an operation, administration, and maintenance (OAM) server or AF. The UDM may provide the SDB HR allowed information to the AMF or SMF. The SDB HR allowed information stored in the UDM may be configured with regard to each PLMN ID. In an example, the SDB HR allowed information may be configured with regard to each PLMN ID of the VPLMN in order to indicate whether SDB HR is allowed with regard to a specific VPLMN. Additionally, information regarding a roaming routing target PLMN (or an alternative HR PLMN) which may be selected when SDR HR is allowed may be included in SDB HR allowed information, or may be connected to SDB HR allowed information which is separately stored and corresponds thereto. In addition, the SDB HR allowed information may be configured with regard to each individual UE/subscriber or configured with regard to a specific UE group. If the SDB HR allowed information is configured with regard to a UE group, SDB HR allowed information corresponding to a UE group ID which may be used to identify the UE group may have been configured. In addition, the UDM may store SDB HR authorization information distinguished from the SDB HR allowed information and may provide the same to the SMF. The SDB HR authorization information may be provided to the SMF in the roaming routing target PLMN and may mean that SDR HR has been authorized with regard to the corresponding UE and the requested PDU session.

In an embodiment, upon receiving the roaming UE's registration request, the AMF may acquire SDB HR allowed information from the UDM. The AMF may receive SDB HR allowed information and roaming routing target PLMN (or alternative HR PLMN) information (for example, identifier or the like) from the UDM, and the information may be used to for H-SMF search and selection upon receiving a PDU session establishment request from the UE. For example, if the AMF has received a PDU session establishment request from the UE, and if the AMF has received at least one of SDB HR allowed information and roaming routing target PLMN (or alternative HR PLMN) information from the UDM, the AMF may perform home SMF selection by using the roaming routing target PLMN ID other than the HPLMN ID which may be identified by the UE's SUPI. In addition, the AMF may select a V-SMF which supports SDR HR, and which can connect to the NF of the roaming routing target PLMN.

Next, detailed procedures regarding the above-described embodiment will be described. Although optional steps are included in the following description for convenience of description, not all operations described below are necessarily performed, depending on various configurations and scenarios on the system, and some operations may be omitted.

In operation 301, the roaming UE may transmit a registration request to the AMF of the VPLMN.

In operation 302, the AMF, AUSF, and UDF may perform an authentication procedure regarding the UE.

In operation 303, the AMF may select a UDM to acquire the UE's subscriber information. The AMF may use PLMN ID information included in the UE' identifier to select a UDM.

In operation 304, the AMF may register AMF information in the UDM as UE context information.

In operation 305, the AMF may acquire the UE's subscriber information from the UDM. The AMF may acquire at least one of SDB HR allowed information and roaming routing target PLMN (or alternative HR PLMN) information from the UDM. The SDB HR allowed information may include information regarding whether SBD HR is allowed with regard to the corresponding UE. In addition, the SDB HR allowed information may be configured with regard to each VPLMN ID, data network name (DNN), and/or single-network slice selection assistance information (S-NSSAI). The SDB HR allowed information may be stored in the UDM together with a roaming routing target PLMN (or alternative HR PLMN) ID. The roaming routing target PLMN (or alternative HR PLMN) ID may indicate a target PLMN in which the roaming UE's session may be created through SDB HR (a PLMN other than the PLMN included in the UE's identifier). Such information may be stored inside SMF selection information in the UDM and may also be provided to the AMF.

In operation 306, the UE may register in the AMF and then transmit a PDU session establishment request message to the AMF.

In operation 307, upon receiving the PDU session establishment request message from the roaming UE, the AMF may perform SMF (V-SMF and/or H-SMF) selection. The AMF may perform SMF selection by considering at least one of the SDB HR allowed information or roaming routing target PLMN (or alternative HR PLMN) information received from the UDM in the previous operation and SDB HR allowed information which is locally configured.

For example, upon receiving SDB HR allowed information, the AMF may select a roaming routing target PLMN (or alternative HR PLMN) ID as the SDR HR target PLMN, and may select the SMF disposed in the selected roaming routing target PLMN as the H-SMF. This may mean that the AMF selects a PLMN which may be identified by subscriber information from the UDM, other than the PLMN identifiable from the roaming UE's identifier, as the home network. In addition, this may mean that, when the AMF performs an H-SMF selection operation, the AMF performs H-SMF search and selection in consideration of the PLMN ID received from the UDM, instead of the PLMN ID included in the UE identifier.

In addition, the AMF may select an SMF which supports SDR HR, and which can connect to the SMF disposed in the roaming routing target PLMN, as a V-SMF.

In operation 308, the AMF may transmit a message for a PDU session creation request (Nsmf_PDUSession_Create SM Context Request) to the V-SMF selected in the previous operation, and may configure and provide information regarding a roaming routing target SMF selected as an H-SMF thereto. For example, the AMF may provide the V-SMF with at least one of roaming routing target SMF information, a roaming routing target PLMN ID, an SDB home routing request indicator, and UE identifier information.

In operation 309, the V-SMF may transmit a PDU session creation request message (PDUSession_Create Request) to the roaming routing target SMF. The PDU session creation request message may include information received from the AMF in the previous operation. For example, the V-SMF may transmit a PDU session creation request message including an SDB home routing request indicator to the H-SMF.

In operation 310, the roaming routing target SMF may play the role of an H-SMF. In order to acquire the UE's subscriber information, the roaming routing target SMF may select the UDM disposed in the home PLMN which may be identified from the UE's identifier, instead of the PLMN in which the roaming routing target SMF is disposed, and may request and acquire the UE's subscriber information. The roaming routing target SMF may receive SDB HR authorization information and/or subscriber information including a target PLMN ID from the UDM. Upon receiving the SDB HR authorization information, the roaming routing target SMF may know that SDR HR has been authorized with regard to the corresponding PDU session.

In operation 311, the roaming routing target SMF may perform a UP path configuration as an H-SMF.

In operation 312, the roaming routing target SMF may transmit a PDU session creation response message (PDUSession_Create Response) including UP path configuration information and/or information indicating that an SDB HR session may be successfully created, to the V-SMF.

In operation 313, the V-SMF may transmit a message (Nsmf_PDUSession_Create SM Context Response) indicating successful creation of a PDU session routed to the roaming routing target PLMN to the AMF.

In operation 314, the AMF may transmit a PDU session establishment response message to the UE to indicate successful creation of the PDU session.

Figure 4A:
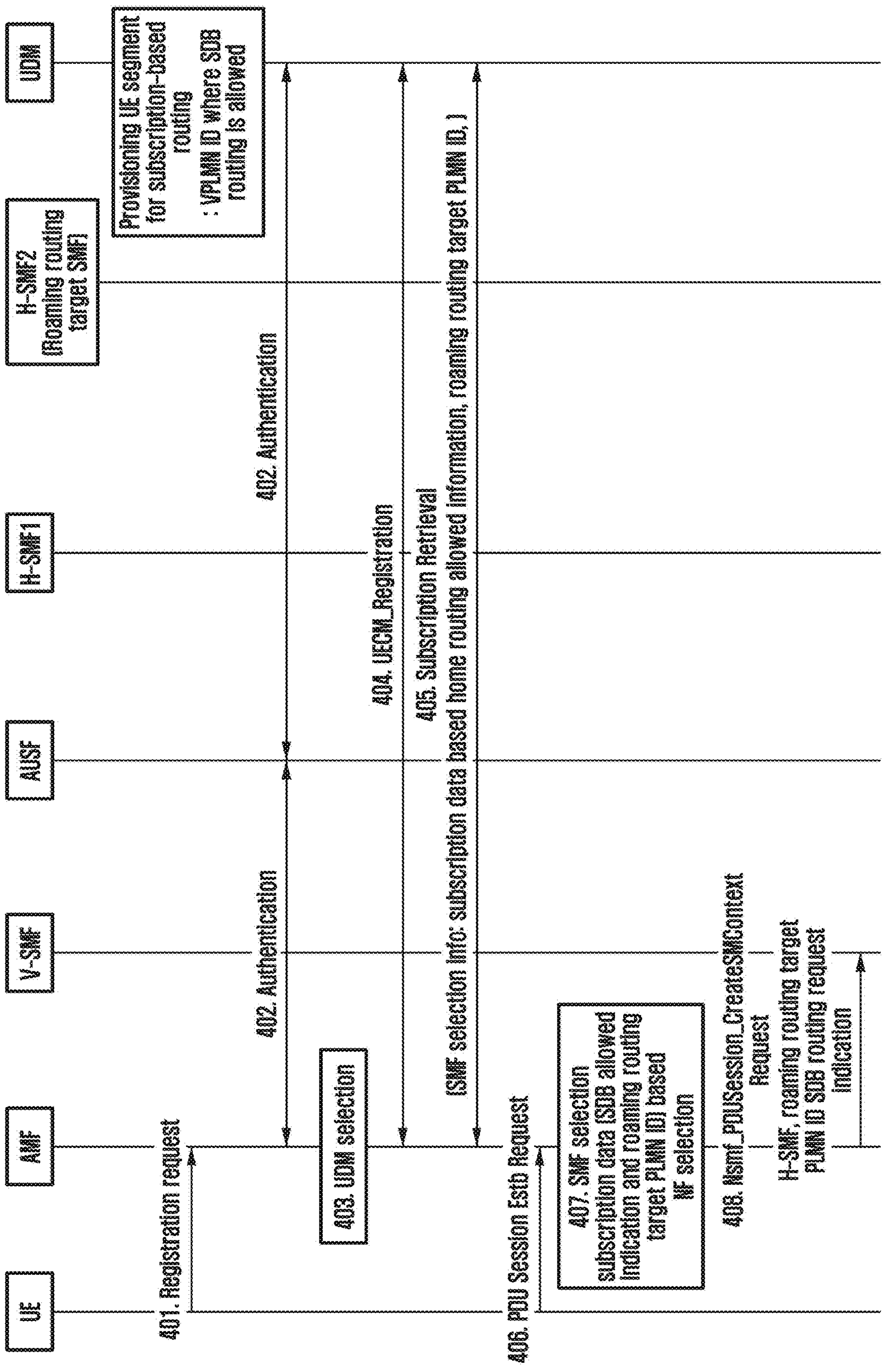
FIGS. 4A and 4B are sequence diagrams illustrating a method for selecting a roaming UE's roaming routing target network or an alternative home routing PLMN according to various embodiments of the disclosure.
Figure 4B:
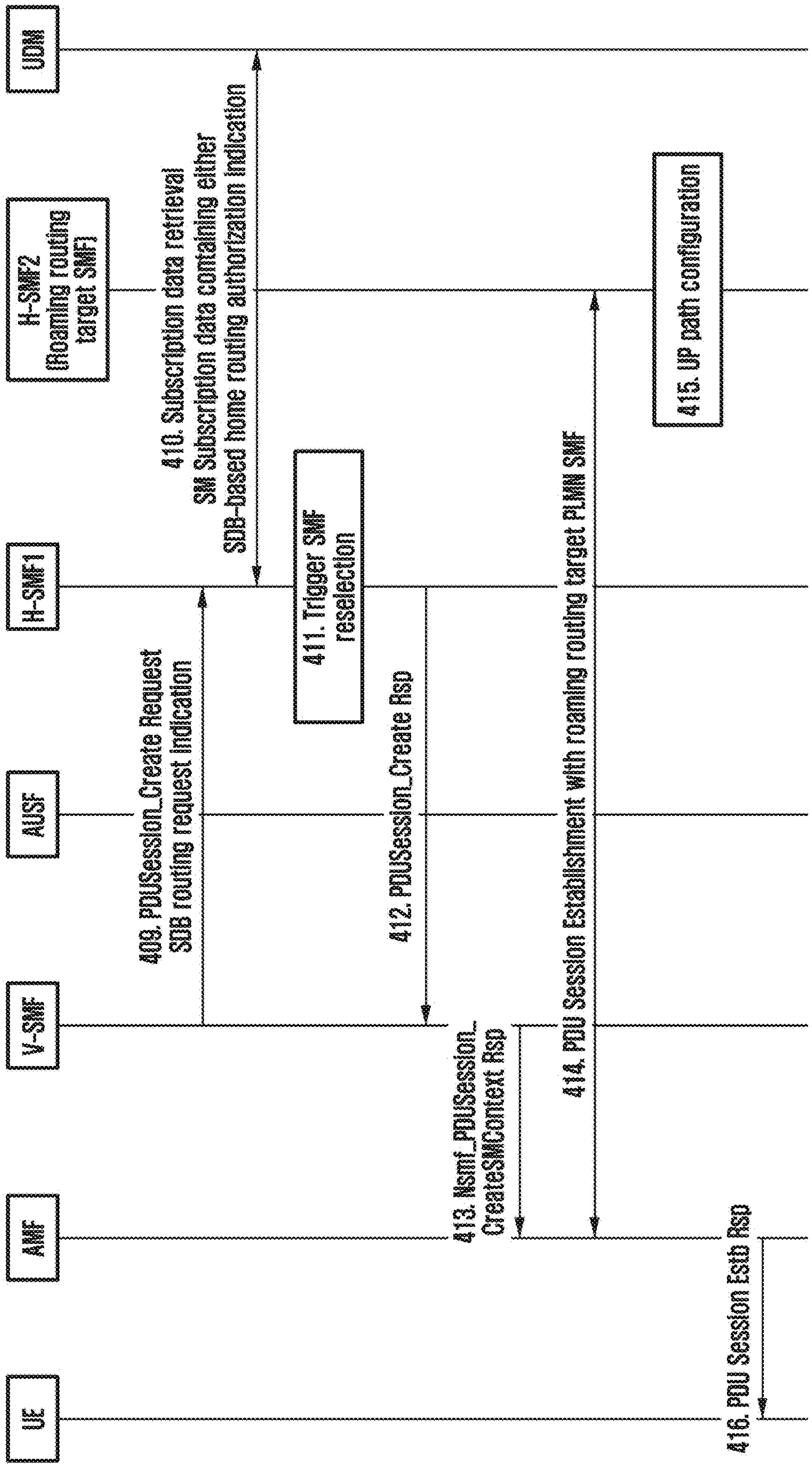

FIGS. 4A and 4B are sequence diagrams illustrating a method for selecting a roaming UE's roaming routing target network or an alternative home routing PLMN according to various embodiments of the disclosure.

Although optional steps are included in the following description for convenience of description, not all operations described below are necessarily performed, depending on various configurations and scenarios on the system, and some operations may be omitted.

Referring to FIG. 4A, in operation 401, the roaming UE may transmit a registration request to the AMF of the VPLMN.

In operation 402, the AMF, AUSF, and UDF may perform an authentication procedure regarding the UE.

In operation 403, the AMF may select a UDM to acquire the UE's subscriber information. The AMF may use PLMN ID information included in the UE' identifier to select a UDM.

In operation 404, the AMF may register AMF information in the UDM as UE context information.

In operation 405, the AMF may acquire the UE's subscriber information from the UDM. The AMF may acquire at least one of SDB HR allowed information and roaming routing target PLMN (or alternative HR PLMN) information from the UDM. The SDB HR allowed information may include information regarding whether SBD HR is allowed with regard to the corresponding UE. In addition, the SDB HR allowed information may be configured with regard to each VPLMN ID, DNN, and/or S-NSSAI. The SDB HR allowed information may be stored in the UDM together with a roaming routing target PLMN (or alternative HR PLMN) ID. In an embodiment, the roaming routing target PLMN (or alternative HR PLMN) ID may indicate a target PLMN in which the roaming UE's session may be created through SDB HR (a PLMN other than the PLMN included in the UE's identifier). Such information may be stored inside SMF selection information in the UDM and may also be provided to the AMF.

In operation 406, the UE may register in the AMF and then transmit a PDU session establishment request message to the AMF.

In operation 407, upon receiving the PDU session establishment request message from the roaming UE, the AMF may perform SMF (V-SMF and/or H-SMF) selection. The AMF may perform SMF selection by considering at least one of the SDB HR allowed information or roaming routing target PLMN (or alternative HR PLMN) information received from the UDM in the previous operation and SDB HR allowed information which is locally configured.

Upon receiving SDB HR allowed information, the AMF may select a roaming routing target PLMN (or alternative HR PLMN) ID as the SDR HR target PLMN, and may select the SMF disposed in the selected roaming routing target PLMN as the H-SMF. This may mean that the AMF selects a PLMN which may be identified by subscriber information from the UDM, other than the PLMN identifiable from the roaming UE's identifier, as the home network. In addition, this may mean that, when the AMF performs an H-SMF selection operation, the AMF performs H-SMF search and selection in consideration of the PLMN ID received from the UDM, instead of the PLMN ID included in the UE identifier.

The AMF may select an SMF which supports SDR HR, and which can connect to the SMF disposed in the roaming routing target PLMN, as a V-SMF.

In operation 408, the AMF may transmit a message for a PDU session creation request (Nsmf_PDUSession_Create SM Context Request) to the V-SMF selected in the previous operation, and may configure and provide information regarding a roaming routing target SMF selected as an H-SMF thereto. For example, the AMF may provide the V-SMF with at least one of roaming routing target SMF information, a roaming routing target PLMN ID, an SDB home routing request indicator, and UE identifier information.

Referring to FIG. 4B, in operation 409, the V-SMF may transmit a PDU session creation request message (PDUSession_Create Request) to the SMF (H-SMF1) of the HPLMN identifiable from the UE identifier. The PDU session creation request message may include information received from the AMF in the previous operation. For example, the V-SMF may transmit a PDU session creation request message including an SDB home routing request indicator to the H-SMF1.

In operation 410, the H-SMF1 may receive SDB HR authorization information from the UDM. Upon receiving the SDB HR authorization information, the H-SMF1 may know that SDR HR has been authorized with regard to the corresponding PDU session. The H-SMF1 may receive SDB HR authorization information and roaming routing target PLMN information (identifier) together from the UDM.

In operation 411, the H-SMF1 may trigger an H-SMF reselection procedure upon receiving at least one of SDB HR authorization information and roaming routing target PLMN information (identifier) in the previous operation.

In operation 412, if the H-SMF reselection procedure has been triggered in the previous operation, the H-SMF1 may transmit a PDU session creation response message (PDUSession_Create Response) including at least one of SDB HR authorization information, roaming routing target PLMN information (identifier), and an H-SMF reselection indicator to the V-SMF.

In operation 413, the V-SMF may provide information received from the H-SMF1 to the AMF, and may transmit a message requesting H-SMF reselection (Nsmf_PDUSession_Create SM Context Response) thereto.

In operation 414, the AMF may perform roaming routing target SMF selection based on information received from the V-SMF, may provide roaming routing target SMF information to the V-SMF, and may perform a PDU session creation operation. The PDU session creation operation may be performed as in operations 408 to 414 in FIG. 3.

In operation 415, the roaming routing target SMF may perform a UP path configuration as an H-SMF (H-SMF2).

In operation 416, the AMF may transmit a PDU session establishment response message to the UE to indicate successful creation of the PDU session.

Figure 5:
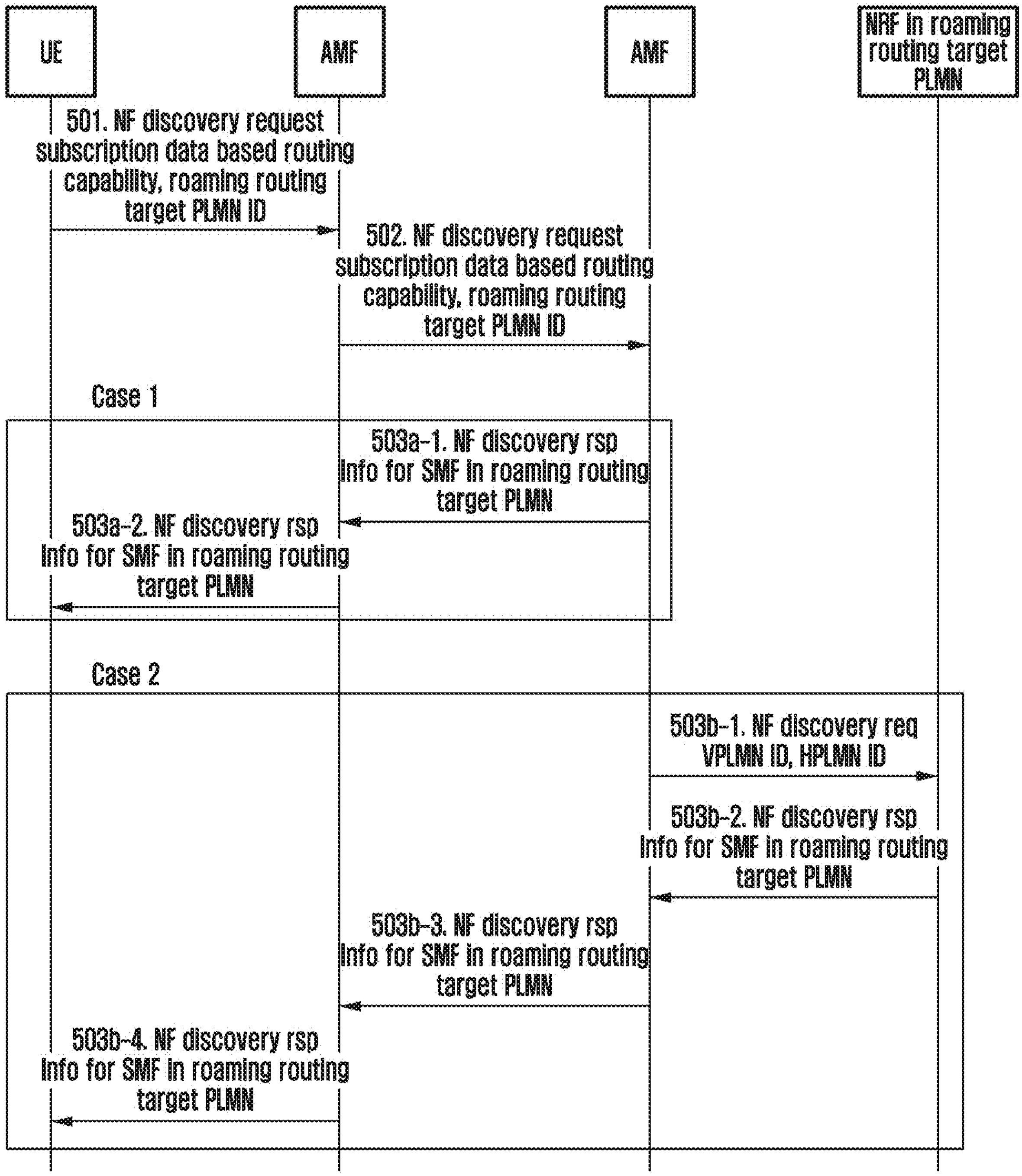
FIG. 5 is a sequence diagram illustrating a method for selecting a roaming routing target SMF of a roaming UE according to an embodiment of the disclosure.

FIG. 5 is a sequence diagram illustrating a method for selecting a roaming routing target SMF of a roaming UE according to an embodiment of the disclosure.

In the embodiment in FIG. 5, a detailed procedure in which the AMF (vAMF) selects a roaming routing target SMF in the embodiment described above with reference to FIGS. 3, 4A, and 4B will be described.

Although optional steps are included in the following description for convenience of description, not all operations described below are necessarily performed, depending on various configurations and scenarios on the system, and some operations may be omitted.

Referring to FIG. 5, in operation 501, the AMF (also referred to as the AMF of the VPLMN in which the UE is roaming, the AMF which the UE has registered in the VPLMN, or the AMF to which the UE may transmit a PDU session establishment request message) may transmit an NF discovery request to the visited NRF (vNRF) which is a network repository function (NRF) in the VPLMN. The NF discovery request may include at least one of a subscription data-based home routing support function (SDB HR capability), a roaming routing target PLMN ID, and UE identifier information.

In operation 502, the vNRF may specify a home NRF (hNRF) which is an NRF in the HPLMN by using HPLMN ID information included in UE identifier information, and may transmit an NF discovery request. The NF discovery request message may include information received from the AMF in the previous operations and/or a VPLMN ID.

In operation 503*a*-1, the hNRF may select information (identifier and address) regarding a roaming routing target SMF disposed in a roaming routing target PLMN, and may transmit a response message to the NF discovery request, including the roaming routing target SMF information, to the vNRF.

In operation 503*a*-2, the vNRF may transmit a response message to the NF discovery request, including the roaming routing target SMF information received from the hNRF to the AMF.

If the hNRF stores no information regarding the network function of the roaming routing target PLMN, above operations 503*a*-1 and 503*a*-2 may not be performed, and following operations 503*b*-1 to 303*b*-4 may be performed.

In operation 503*b*-1, the hNRF may transmit an NF discovery request to the NRF disposed in the roaming routing target PLMN according to the operator policy configured in the hNRF, or in the case of no stored information regarding the network function disposed in the roaming routing target PLMN ID inside information received from the vNRF. In an embodiment, the message transmitted from the hNRF to the NRF of the roaming routing target PLMN may include at least one of a VPLMN ID, a HPLMN ID, a UE identifier, and subscription data-based home routing support function (SDB HR capability) information.

In operation 503*b*-2, the NRF of the roaming routing target PLMN may transmit a response message to the NF discovery request to the hNRF. The response message may include roaming routing target SMF information.

In operation 503*b*-3, the hNRF may transmit a response message to the NF discovery request, including SMF information received from the NRF of the roaming routing target PLMN to the vNRF.

In operation 503*b*-4, the vNRF may transmit a response message to the NF discovery request, including the roaming routing target SMF information received from the hNRF to the AMF.

The AMF may map the roaming routing target SMF information received from the vNRF to the HPLMN ID and/or roaming routing target PLMN ID and then store the same. Upon receiving the roaming UE's PDU session establishment request, the AMF may provide information regarding the roaming routing target SMF to the V-SMF.

Figure 6:
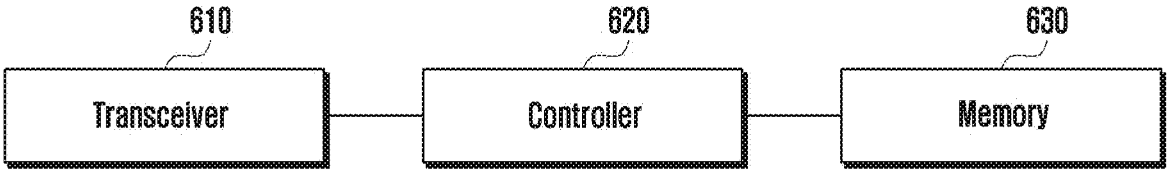
FIG. 6 illustrates a structure of an NF according to an embodiment of the disclosure.

FIG. 6 illustrates a structure of an NF according to an embodiment of the disclosure.

Referring to FIG. 6, the NF may include a transceiver 610, a controller 620, and a memory 630. The NF may refer to an AMF, an SMF, a PCF, a UPF, an AF, a UDM, an NRF, or the like. The transceiver 610, controller 620, and memory 630 of the NF may operate according to at least one of methods corresponding to above-described embodiments, or a combination thereof. The controller may be defined as a circuit or an application-specific integrated circuit or at least one processor.

The transceiver 610 may transmit/receive signals with other network entities. The transceiver 610 may transmit control messages and/or subscribed information to other NFs, and may receive control messages and/or subscribed information from other NFs.

In an embodiment, the controller 620 may control overall operations of the NF according to an embodiment proposed in the disclosure. For example, the controller 620 may control signal flows between respective blocks so as to perform operations according to the above-descried flowchart. Specifically, the controller 620 may control a series of operations for selecting a roaming UE's roaming routing target network or alternatively home routing PLMN according to an embodiment of the disclosure.

The memory 630 may store at least one of information transmitted/received through the transceiver 610 and information generated through the controller 620.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by an access and mobility management function (AMF) in a communication system, the method comprising:

receiving, from a user equipment (UE), a registration request message;

receiving, from a unified data management (UDM), subscription information for session management function (SMF) selection including an identifier (ID) of a target public land mobile network (PLMN) for traffic routing; and selecting an SMF for traffic routing in the target PLMN based on the ID of the target PLMN included in the subscription information.

2. The method of claim 1, wherein the selecting of the SMF for traffic routing in the target PLMN comprises:

transmitting, to a visited-network repository function (v-NRF), a network function (NF) discovery request message for SMF selection including the ID of the target PLMN; and receiving, from the v-NRF, an NF discovery response message including information on the SMF for traffic routing in the target PLMN.

3. The method of claim 1, wherein the subscription information is associated with per single-network slice selection assistance information (S-NSSAI) or per data network name (DNN).

4. The method of claim 1, further comprising:

transmitting, to an SMF in a visited PLMN, the information on the SMF for traffic routing in the target PLMN.

5. A method performed by a visited-network repository function (v-NRF) in a communication system, the method comprising:

receiving, from an access and mobility management function (AMF), a first network function (NF) discovery request message for session management function (SMF) selection including an identifier (ID) of a target public land mobile network (PLMN) for traffic routing;

transmitting, to a home-network repository function (h-NRF), a second NF discovery request message including the ID of the target PLMN;

receiving, from h-NRF, a first NF discovery request response message including information on an SMF for traffic routing in the target PLMN; and transmitting, to the AMF, a second NF discovery request response message including information on the SMF for traffic routing in the target PLMN.

6. The method of claim 5, wherein the h-NRF is identified based on identifier information of a user equipment (UE).

7. A method performed by a home-network repository function (h-NRF) in a communication system, the method comprising:

receiving, from a visited-network repository function (v-NRF), a first network function (NF) discovery request message including an identifier (ID) of a target public land mobile network (PLMN) for traffic routing;

identifying an SMF for traffic routing in the target PLMN based on the ID of the target PLMN; and transmitting, to the v-NRF, a first NF discovery request response message including information on the SMF for traffic routing in the target PLMN.

8. The method of claim 7, wherein the identifying of the SMF for traffic routing in the target PLMN comprises:

transmitting, to an NRF in the target PLMN, a second NF discovery request based on a configuration in the h-NRF; and receiving, from the NRF in the target PLMN, a second NF discovery request response message including information on the SMF for traffic routing in the target PLMN.

9. An access and mobility management function (AMF) in a communication system, the AMF comprising:

a transceiver; and a controller coupled with the transceiver and configured to:

receive, from a user equipment (UE), a registration request message, receive, from a unified data management (UDM), subscription information for session management function (SMF) selection including an identifier (ID) of a target public land mobile network (PLMN) for traffic routing, and select an SMF for traffic routing in the target PLMN based on the ID of the target PLMN included in the subscription information.

10. The AMF of claim 9, wherein, to select the SMF for traffic routing in the target PLMN, the controller is configured to:

transmit, to a visited-network repository function (v-NRF), a network function (NF) discovery request message for SMF selection including the ID of the target PLMN; and receive, from the v-NRF, an NF discovery response message including information on the SMF for traffic routing in the target PLMN.

11. The AMF of claim 9, wherein the subscription information is associated with per single-network slice selection assistance information (S-NSSAI) or per data network name (DNN).

12. The AMF of claim 9, wherein the controller is further configured to:

transmit, to an SMF in a visited PLMN, the information on the SMF for traffic routing in the target PLMN.

13. A visited-network repository function (v-NRF) in a communication system, the v-NRF comprising:

a transceiver; and a controller coupled with the transceiver and configured to:

receive, from an access and mobility management function (AMF), a first network function (NF) discovery request message for session management function (SMF) selection including an identifier (ID) of a target public land mobile network (PLMN) for traffic routing, transmit, to a home-network repository function (h-NRF), a second NF discovery request message including the ID of the target PLMN, receive, from h-NRF, a first NF discovery request response message including information on an SMF for traffic routing in the target PLMN, and transmit, to the AMF, a second NF discovery request response message including information on the SMF for traffic routing in the target PLMN.

14. The v-NRF of claim 13, wherein the h-NRF is identified based on identifier information of a user equipment (UE).

15. A home-network repository function (h-NRF) in a communication system, the h-NRF comprising:

a transceiver; and a controller coupled with the transceiver and configured to:

receive, from a visited-network repository function (v-NRF), a first network function (NF) discovery request message including an identifier (ID) of a target public land mobile network (PLMN) for traffic routing, identify an SMF for traffic routing in the target PLMN based on the ID of the target PLMN, and transmit, to the v-NRF, a first NF discovery request response message including information on the SMF for traffic routing in the target PLMN.

16. The h-NRF of claim 15, wherein, to identify the SMF for traffic routing in the target PLMN, the controller is configured to:

transmit, to an NRF in the target PLMN, a second NF discovery request based on a configuration in the h-NRF; and receive, from the NRF in the target PLMN, a second NF discovery request response message including information on the SMF for traffic routing in the target PLMN.

* * * * *